Figure 1A:
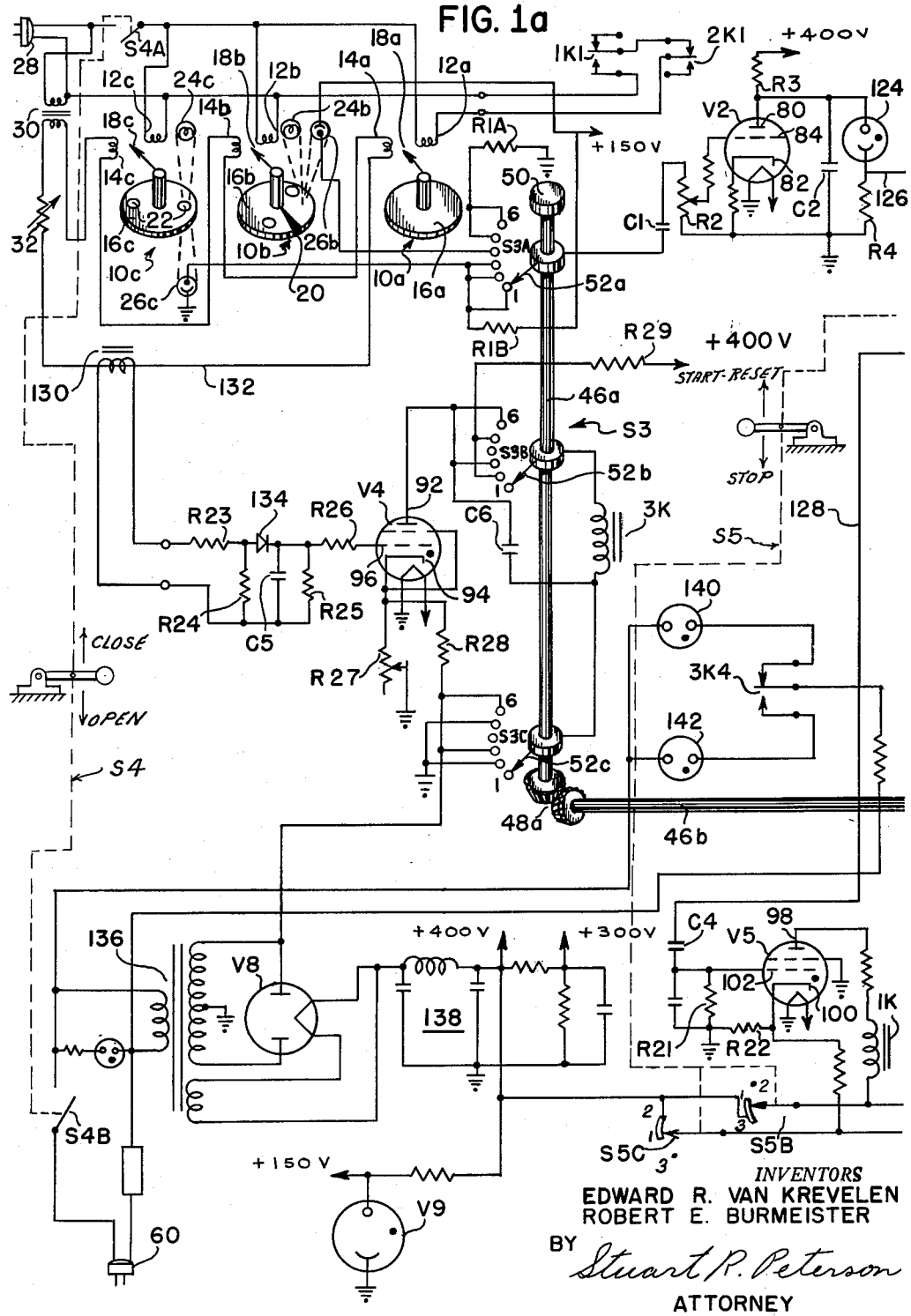

April 18, 1961  E. R. VAN KREVELEN ET AL  2,980,856
PHOTOELECTRONIC COUNTER
Filed March 3, 1955  2 Sheets-Sheet 1

INVENTORS
EDWARD R. VAN KREVELEN
ROBERT E. BURMEISTER
BY Stuart R. Peterson
ATTORNEY April 18, 1961  E. R. VAN KREVELEN ET AL  2,980,856
PHOTOELECTRONIC COUNTER
Filed March 3, 1955  2 Sheets-Sheet 2

INVENTORS
EDWARD R. VAN KREVELEN
ROBERT E. BURMEISTER
BY Stuart R. Peterson
ATTORNEY

United States Patent Office 2,980,856
Patented Apr. 18, 1961

2,980,856
PHOTOELECTRONIC COUNTER

Edward R. Van Krevelen and Robert E. Burmeister, Minneapolis, Minn., assignors to General Mills, Inc., a corporation of Delaware Filed Mar. 3, 1955, Ser. No. 491,924

19 Claims. (Cl. 324—74)

This invention relates generally to photoelectric counters and pertains more specifically to a counter of this character possessing special utility in the calibration of watt-hour meters. In its specific aspects, the invention comprehends the precise starting and subsequent stopping of a standard watthour meter in accordance with the rotation of the watthour meter undergoing test. By visually reading the dials of the standard meter, and by knowing the number of revolutions made by the induction disc of the test meter, the accuracy of the watthour being tested is effectively checked.

One object of the invention is to provide an electronic counter capable of "light" or "dark" counting where a rotatable disc or wheel is involved. More specifically, in the testing of watthour meters sometimes it is more expeditious to employ a photoelectric arrangement whereby a source of light is transmitted through what are commonly termed "anti-creep" holes in the rotating induction disc and at other times it is more convenient to resort to a reflective type of testing where a darkened spot on the induction disc serves as a means whereby less light is reflected than is normally reflected. Therefore, it will be recognized that the electronic counter forming the subject matter of the instant invention is versatile in its operation and can be used in the counting of revolutions in different manners depending upon the circumstances at hand.

Another object of the invention, this object pertaining particularly to the testing of watthour meters, concerns the facile switching from a full load to a light load condition, this taking place either manually or in automatic fashion. Also, it is within the contemplation of the invention to provide indicating lights showing which load condition is beng used at that particular moment.

A further object of the invention is to provide a counting system which will indicate the true number of revolutions that have been made independently of whether the above alluded to light or dark testing method is utilized. Stated somewhat differently, the counter provides a direct reading method which is not dependent upon the specific testing procedure being utilized.

A further object of the invention includes a counting system which is very accurate, reliable, and capable of being used by inexperienced attendants with little effort on their part.

A still further object of the invention is to produce a counter that will be of relatively low cost, one which is very compact for portability, and one that has few moving mechanical parts.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1B:
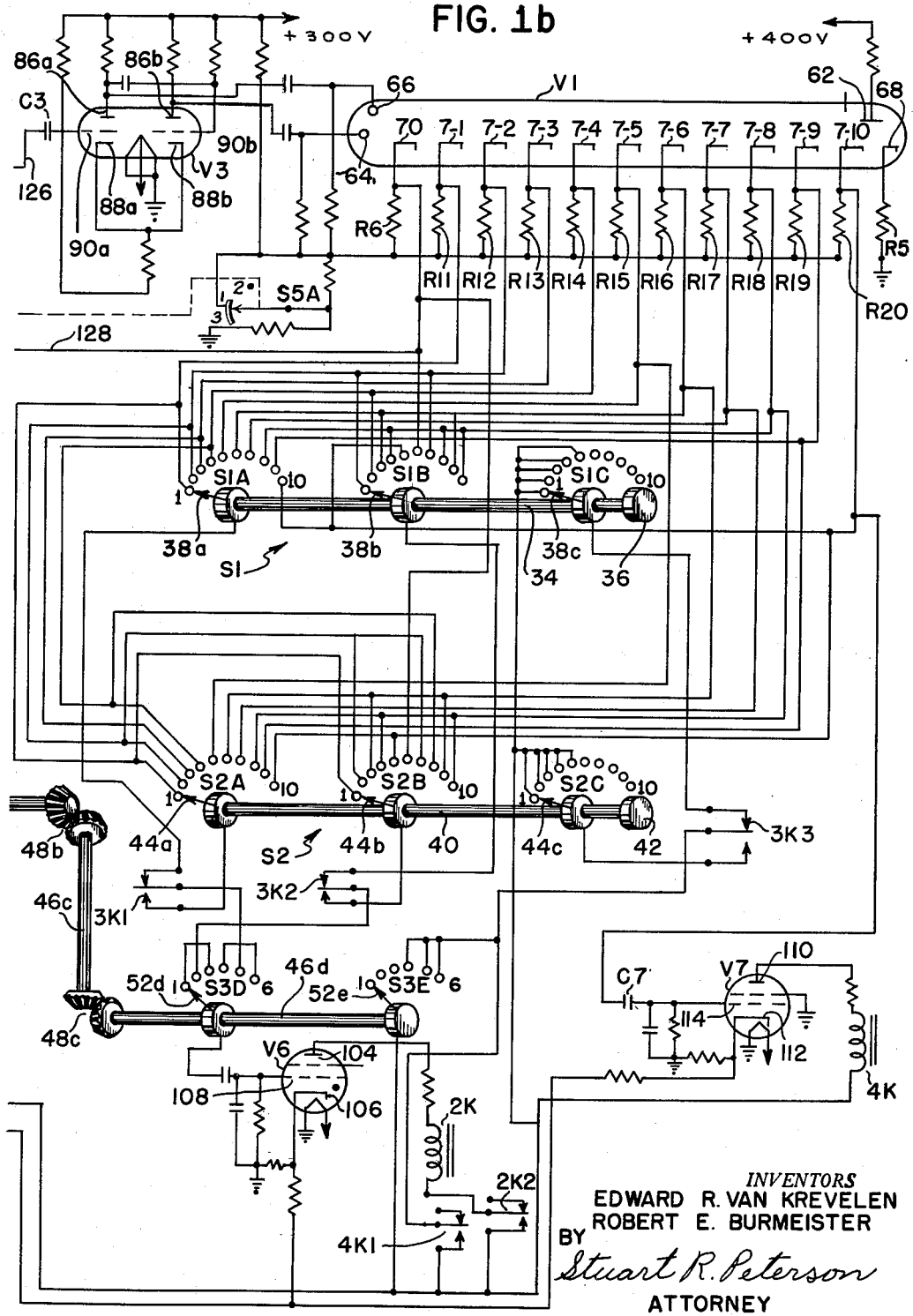

In the drawing:

Figures 1a and 1b are side by side schematic diagrams illustrating one specific circuit that the invention may assume and in using these two figures it will be appreciated that Fig. 1a is to be placed to the left of Fig. 1b and that the two views when thus placed together may be read as a single drawing, Fig. 1b having connection at several designated points with Fig. 1a.

Referring in detail to Figs. 1a and 1b, it will be observed that a standard watthour meter designated by the numeral 10a is to serve as the "standard" with which a first "test" watthour meter 10b and a second "test" watthour meter 10c are to be compared. Conventionally, the watthour meters 10a, 10b, and 10c are equipped with potential coils 12a, 12b, and 12c, respectively. Further, these meters also are provided with current coils 14a, 14b, and 14c. The potential coils and the current coils set up an inductive field which is responsible for the rotation of their respective induction discs labeled 16a, 16b, and 16c. Also, as will be seen from an inspection of Fig. 1a, the various induction discs are equipped with indicators 18a, 18b, and 18c, these indicators being generally represented by rotatable arrows affixed to the shafts of the various induction discs.

Actually, resort has been made to the two different test meters 10b and 10c primarily to illustrate the versatility of the counting system when employed in the testing of watthour meters. To this end, a black or darkened mark 20 is shown on the induction disc 16b and in conjunction with the induction disc 16c it will be noted that a pair of diametrically spaced anti-creep holes 22 are illustrated. In both instances, as far as the two test meters 10b and 10c are concerned, respective light sources 24b and 24c are surmounted above the two induction discs 16b and 16c. Also, properly oriented with respect to these induction discs are a pair of photoelectric cells 26b and 26c. In the case of the first test watthour meter 10b, this one being tested with what will be termed the dark or reflective method, the photoelectric cell is disposed so as to receive light that has been reflected from the surface of the induction disc 16b, whereas the photoelectric cell 26c is positioned adjacent the disc 16c so that light passing through the anti-creep holes 22 will impinge upon the particular photoelecric cell 26c.

For the purpose of supplying electric power in conventional fashion to the various potential and current coils a plug of the bayonet type labeled 28 has been depicted, this plug being connectable to any convenient electric outlet. In circuit with the plug 28 is a transformer 30 which is instrumental in stepping the voltage supplied via the plug 28 down to a suitable value for the various current coils 14a, 14b, and 14c. Also it is intended that some suitable arrangement be incorporated into the system for varying the current to be supplied to the current coils 14a, 14b, and 14c, and to this end a rheostat 32 is pictured.

In order to put into practical effect the various objects enumerated hereinbefore, a number of switch assemblies are employed in the counting system. First it will be apparent that a light load selector switch assembly designated S1 is used, and in order to select a full load type of operation a similar switch assembly S2 is used. Also, since it is envisaged that automatic "full load" to "light load" operation be effected a switch serving this primary objective is utilized and has been given the character S3. Further, a power switch S4 is shown and this may consist of two independent switches S4A and S4B. Still further, a start and stop switch S5 may be employed and as will presently be pointed out this switch is a three position type of switch.

Describing the individual rotary switch assemblies in more detail, it will be seen that the light load selector switch S1 includes individual rotary switches designated S1A, S1B, S1C ganged together for operation in unison by reason of a connecting shaft 34 provided with an adjusting knob 36 at one end. Further, each of the switch units S1A, S1B, and S1C is equipped with contact arms 38a, 38b, and 38c, these contact arms having respective engagement with 10 individual contacts. Similarly, the switch assembly S2 comprises a plurality of individual switch units S2A, S2B, and S2C having a shaft 40 connecting these switch units in a ganged arrangement for unitary operation whenever an adjusting knob 42 is rotated. As with the switch S1, the switch S2 is provided with several contact arms 44a, 44b, 44c, each engageable with a series of 10 individual contacts. The switch S3 is composed of individual switch units S3A, S3B, S3C, S3D, and S3E, these individual units being mounted for unitary rotation by reason of a shaft 46a connecting the units S3A, S3B, and S3C together, and a first intermediate shaft 46b, a second intermediate shaft 46c and a final shaft 46d responsible for ganging the switch units S3D and S3E together. By virtue of bevel gears 48a, 48b, and 48c the various shafts 46a, 46b, 46c, and 46d are maintained in synchronism with each other and are moved in unison whenever an adjusting knob 50 disposed at one end of the shaft 46a is rotated. Also, as with the earlier described switch assemblies the various units comprising the assembly S3 include respective contact arms 52a, 52b, 52c, 52d, and 52e each engageable with six individual contacts. Although it will become clearer as the explanation progresses, it might be pointed out at this time that the various contacts used in the construction of the switch S3 serve the purpose of providing either "light" or "dark" operation and also in determining whether a "light load to full load" automatic operation is to be realized. More specifically, when the switch S3 is rotated to its first contact position, as illustrated, the circuit is connected for light load operation, whereas when the switch S3 is moved to its second contact position it is arranged for a full load operation under the light conditions. A further movement of the switch S3 to its third contact results in automatic operation. These first three contact positions all give the "light" method of operation. The fourth contact position conditions the entire circuit for light load operation with the "dark" or "reflective" method. The fifth contact position keeps the system set for a dark operation but is responsible for producing full load testing under these dark operations, whereas the sixth contact position produces an automatic operation under the stated dark condition. The switch S4 has already been referred to as including switch sections S4A and S4B. However, it should be pointed out that the switch S4B is in the circuit with a second plug 60 corresponding to the plug 28. Actually it is possible to combine the functions of the two plugs 28 and 60 thereby requiring only a single switch section instead of the two individual ones. With reference to the start and stop switch labeled generally by the character S5 it is to be appreciated that this switch which is composed of respective switch sections S5A, S5B, and S5C is arranged to be moved in unison even though as shown in the drawing the switch S5A is separated by a considerable distance from the switch elements S5B and S5C. Basically, the function of the S5A and the S5B switch component is a starting and resetting one whereas the S5C component performs a stop function.

Passing now to a description of the more important tubes employed in the circuitry forming the subject matter of the invention, it will be noted that a cold cathode glow discharge counting tube V1 is utilized which is of the type GS-12C. This tube V1 includes a plate 62 connected to a source of D.C. potential of approximately 400 volts. Also included in the tube is a pair of transfer electrodes 64 and 66. Still further a plurality of cathodes are incorporated into the tubes, these cathodes being designated by the following numerals 68, 70, 7-1, 7-2, 7-3, 7-4, 7-5, 7-6, 7-7, 7-8, 7-9, and 7-10. In the operational description to be presented later the various roles played by these cathodes will be better understood as will the action of the two transfer electrodes 64 and 66.

Continuing with the tube description, an amplifying tube V2, which may be one-half of a 12AX7 tube, is employed, this tube having a plate 80, a cathode 82 and a grid 84. Further, a tube V3 which may also be a 12AX7 type performs a triggering function and as illustrated both sides of this double tube are used, the tube having plates 86a, 86b, cathodes 88a, 88b and grids 90a, 90b. Closely associated with the "full load-light load" switch S3 is a thyratron tube V4 of the type 2D21, this tube having a plate 92, cathode 94 and a grid element 96. A further thyratron tube V5 is employed and this tube includes a plate 98, a cathode 100, and a grid 102. What might be termed a "start" thyratron tube V6 is equipped with a plate 104, a cathode 106, and a grid 108. Still further, this tube to be described performing a hold function, is V7 equipped with a plate 110, a cathode 112 and a grid 114. As is the case with the tube V4, tubes V5, V6, and V7 may be 2D21 tubes. A rectifier tube V8 of the type 5Y3GT is also employed in conjunction with the production of the various plate voltages, this tube having a pair of plates 116a and 116b together with a cathode 118. Also in conjunction with the supply of the various B plus voltages a tube V9 of the OA2 type is employed, this tube acting to maintain the 150 volt supply for the photoelectric tubes 26b and 26c of constant magnitude.

Coming now to a description of the various relays employed in conjunction with the foregoing components, a first relay designated 1K has its coil in the plate circuit of the tube V5, this relay being provided with contacts 1K1 which are controlled so as to energize the potential coil 12a. Another relay 2K has its coil in the plate circuit of the tube V6 and is equipped with two individual sets of contacts 2K1 for the purpose of deenergizing the potential coils 12a, 12b, and 12c and the contacts 2K2 for the purpose of assuring that the potential coils will remain deenergized between different tests. Another relay 3K is in the circuit with the tube V4 and is under the control of the switch S3. This relay 3K is provided with a plurality of double contacts labeled 3K1, 3K2, 3K3, and 3K4 which are for the purpose of rendering either the light load switch S1 or the full load switch S2 effective, depending on whether the relay 3K is energized or not, these particular contacts being up for light load operation and down for full load operation. Still further, a relay 4K is utilized in the plate circuit of the tube V7 which relay is provided with contacts 4K1 paralleling the previously mentioned contacts 2K2.

The tubes V8 and V9 cooperate in supplying a relatively constant 150 volt D.C. potential to the photoelectric cells 26b and 26c. In circuit with these photoelectric cells is a pair of resistors R1A and R1B. The resistor R1A is utilized when the reflective method is employed whereas the R1B resistor is utilized when the light method is relied upon and the switching unit responsible for the selection for the particular photoelectric cell is switch unit S3A. For the purpose of supplying pulses from either of the photoelectric tubes 26b or 26c to the grid element 84 of the amplifying tube V2 there is a condenser C1 and a potentiometer R2 in circuit between the switch arm 52a and this grid 84. As will hereinafter be set forth with more clarity, the trigger tube V3 will require relatively sharp pulses for triggering itself and to this end a resistor R3 and a condenser C2 are used, the resistor R3 being in the plate circuit of the tube V2 and connected at one end to a 400 volt D.C. supply voltage. Also aiding in the production of sharp pulses to be applied to the trigger tube V3 is a neon tube 124 of the NE51 type which is connected to ground by way of a resistor R4. Intermediate the resistor R4 and the tube 124 is a conductor 126 leading to a coupling condenser C3. The plates 86a and 86b of the triggering tube V3 are connected to the transfer electrodes 66, 64, respectively, of the counting tube V1. However, as already mentioned, the function of the transfer electrodes 64 and 66 will be made clearer later on in the description, particularly in conjunction with the operational aspects of the system.

It is to be observed that the various cathodes of the tube V1 are connected to a number of different resistors. For example, the cathode 68 is connected to a resistor R5, the cathode 70, to a resistor R6 and the various cathodes 7–1 through 7–10, inclusive, to the various resistors R11 through R20. The cathode 70 of V1 is connected to the grid 102 of V5 by way of a conductor 128 and a coupling condenser C4. Also associated with the tube V5, the purpose being to bias this tube to cut off, is a pair of resistors R21 and R22. The counting tube V1 is further directly associated with another tube, this being the "stop" tube V6. It will be seen that the grid 108 of V6 is selectively coupled to any of the cathodes 7–1 through 7–10 by means of the switches S1 or S2, this electrically conductive path being via the switch arm 52d of the switch unit S3D.

Aiding in the full load-light load switching operation is a current transformer 130 which is designed to be circumscribed about a conductor 132 in series with the various current coils 14a, 14b, and 14c. This current transformer is removable and can be easily slipped over the conductor 132 or detached therefrom. The secondary terminals of the transformer 130 are connected to resistors R23 and R24, the purpose of which is to divide the voltage coming from the current transformer. After division has been obtained, the voltage is impressed upon a rectifier 134 and it is then subjected to a filtering action by virtue of a condenser C5 and a resistor R25 to give a pure D.C. voltage via the current limiting resistor R26 for the grid 96 of the tube V4.

It might be pointed out at this particular time that by means of the switch unit S3B the relay 3K is in the plate circuit of the tube V4 and by means of the switch unit S3C this relay is also connected to a 350 volt A.C. source furnished by means of a transformer 136. A condenser C6 is connected between the plate 92 of the tube V4 and the switch arm 52c to keep the relay 3K energized on negative plate swings. In addition, a pair of resistors R27 and R28 furnish a bias to the grid 96 of the V4 having such a magnitude as to preset this tube so that it will fire any time the current in the meter circuit reaches a predetermined value. As pointed out above, the current transformer 130 is instrumental in impressing a modifying grid potential on the grid 96 of the tube V4. Inasmuch as the resistor R27 is in the form of a potentiometer, it will be appreciated the bias on the grid 96 may be adjusted for various current values carried by the conductor 132. For example, if the full load current for one meter is 50 amperes and the light load current is 5 amperes, the resistor R27 would be set so that cut-off of the tube V4 will occur in this current range, whereas if a meter having a 5 ampere full load rating and a 0.5 ampere light load rating is to be tested, then the tube V4 can be biased for this lower range of current. A transformer 136, together with a rectifier tube V8, actually supplies all of the bias that is necessary in operating the system. In this regard it will be observed that a filter designated generally by the numeral 138 is employed in circuit with the tube V8 and by means of additional resistances suitable tapped voltages of 400 volts, 300 volts, and 150 volts are obtained, the tube V9 maintaining the 150 volt supply relatively constant. As hereinbefore indicated, the contact points two and five of the switch unit S3B are connectable to a 400 volt D.C. supply via a resistor 29. Also associated with the full load-light load switch S3 is a pair of neon lights 140 and 142 which are energized selectively by the contacts 3K4, the neon light 140 when lit indicating "light load" operation and the neon light 142 when lit denoting "full load" operation.

In conjunction with the functioning of the "hold tube" V7 it will be noted that a condenser C7 is in circuit with the grid 114 of this tube and the cathode 7–10 of the counting tube of V1. However, the precise function played by the tube V7 and the mentioned connection with the cathode 7–10 has been reserved for explanation during the operational sequence to follow.

As will presently be made manifest from the operational description, the foregoing apparatus is basically a device for counting the revolutions of a meter under test. In the case of watthour meter testing the standard watthour meter is started at the beginning of a count and it is stopped at the end of a predetermined number of revolutions. Since both the standard watthour meter and the watthour meter undergoing test are metering the same load, it will be apparent that a direct comparison between the standard meter and the test meter can be made for purposes of calibration. As an introduction to the functioning of the apparatus, it should be pointed out that the device is capable of counting any predetermined number of revolutions from one to ten, inclusive, with the reflective method, which method would be used in conjunction with the watthour meter labeled 10b. A probe assembly having thereon the light source 24b and the photoelectric cell 26b senses the single black mark 20 on the disc 16b. In this situation the counter must be capable of counting 11 pulses, for the first pulse would start the standard meter 10a and the 10 ensuing pulses would provide the total revolution count of 10. On the other hand, with the "light" method where the light 24c shines through one of the two diametrically spaced apertures or anti-creep holes 22 in the meter disc 16c to the photoelectric cell 26c disposed subjacent this disc, the counter must be capable of counting to twenty-one. The first pulse starts the standard meter 10a and the other twenty provide a total revolution count of ten, it being remembered that there are two anti-creep holes 22 and the passage of each anti-creep hole 22 into the path of light providing what amounts to a count of ½ revolution. In order to adapt the system to the testing of meters either with the reflective or light procedure appropriate switching within the counter circuitry permits one revolution preselector to be used for both systems.

Assuming for the moment that it is desired to utilize the reflective method and that the watthour meter 10b will be the one subjected to the testing procedure, it will be apparent that a quiescent light condition prevails to the extent that the source of light 24b emits a beam which is almost continuously reflective from the disc 16b to the photoelectric cell 26b, thereby causing it to conduct a relatively large amount of current, inasmuch as the induction disc 16b is generally light reflective in character except for the dark mark or spot 20. This current causes the impressed voltage, which is 150 volts D.C., to divide between the photoelectric cell 26b and the resistor R1A to bring the arm 52a to some potential above ground, the switch S3 having been moved into, say, its number 5 position, which will give full load testing under the reflective method. Now, when the black spot 20 on the disc 16b passes under the photoelectric cell 26b, it will receive less light by virtue of the darker condition of the disc in the region designated by the mark 20 and due to the reception of less light the resistance of the tube 26b increases substantially. This changes the voltage divider ratio and causes the potential of the arm 52a to be lowered, the negative change in the potential being impressed upon the grid 84 of the amplifying tube V2 to the condenser C1 and the gain control potentiometer R2. The value of the condenser C1 is 0.5 $\mu$f. and the resistance of the resistor R2 is in the neighborhood of 1.0 megohm. The time constant of C1 and R2 is such that very slow changes in potential at the arm 52a will be impressed on the grid 84. Since the trigger tube V3 will accept only sharp pulses it is necessary that a gradual change in potential from a slow moving disc be converted to a rapid change in potential (in the form of a pulse) for the trigger tube V3. This is accomplished by the resistor R3 and the condenser C2 in the following manner.

In a quiescent condition, the tube V2 is conducting current and the IR drop across the resistor R3 is such that the plate 80 of V2 has a positive potential with respect to ground of about 20 volts, the resistor R3 having a value of approximately 3.3 megohms and C2 having a value of 0.01 $\mu$f. C2, therefore, has a charge across it of approximately 20 volts. As the grid 84 goes negative the tube V2 conducts less current and the potential at the plate 80 of this tube and the potential across the condenser C2 rises. When this potential reaches a magnitude of substantially 70 volts the neon tube 124 will fire causing the condenser C2 to discharge through the resistor R4 which resistor has a value of approximately 27,000 ohms. This charge of current will cause a momentary voltage drop across the resistor R4 which brings the potential of the conductor 126 to an immediate positive value with respect to ground. Since the neon tube 124 has a running potential of about 55 volts (after firing) the charge difference of the 70 volts less the 55 volts on the condenser C2 must dissipate immediately into the resistor R4. Any further increase in the plate resistance will increase the current through the tube 124 and since the resistor R4 is small compared to R3 only a very small voltage will be developed across the resistor R4 due to this increase. The discharge of the condenser C2 will cause the conductor 126 to go positive by 15 volts (the difference between the firing and the running voltages of the tube 124). After the initial surge point has been reached, the potential of the conductor 126 will drop to a value of about 2 volts and will increase only slightly with an increase in plate resistance of the tube as its grid 84 continues to go negative.

The positive pulse across the resistor R4 is coupled by means of the condenser C3 into the trigger tube V3. The tube V2 provides suitable impulses to the counting tube V1 which has already been referred to as a cold cathode glow discharge counting tube of the GS-12C type. These impulses feed to the tube V1 and are responsible for the glow within the tube jumping from the conducting cathode to the next adjacent cathode. Owing to the fact that the various cathodes within the tube V1 are connected to ground through a plurality of resistors, these resistors having already been indicated as being R5, R6, and R11-R20, a conducting cathode will assume a potential which is positive with respect to ground by the amount of the IR drop in the particular cathode resistor which is at that time active.

Before actually beginning the test the switch S5A should be opened, raising all of the cathodes on the reset bus high above the ground and forcing the glow to jump to the cathode 68. The switch S5A can then be closed and the glow will remain on the cathode 68. However, when the test begins, the first pulse from the amplifier tube V2 as modified by the tube V3 will cause the glow to jump to the cathode 70 causing it to go positive immediately. This abrupt rise in potential is coupled to the grid of the start thyratron tube V5 by the condenser C4. Since the tube V5 is biased to cutoff by reason of the resistors R21 and R22, these resistors having respective values of 1 megohm and 2,200 ohms, the positive pulse so transmitted causes the tube V5 to fire and as a consequence of the firing of the tube the relay 1K is energized, thus completing the potential circuit to the standard meter 10a inasmuch as the relay 1K is responsible for closing its contacts 1K1. The tube V5 will remain fired until the positive potential is removed from its plate circuit by the switch S5B, this having been done at the beginning of the test at the same time the counting tube V1 was reset.

Assuming that 10 complete revolutions of the induction disc 16b are desired, the full load selector switch S1 will be moved to its number 10 position which switch movement is instrumental in preparing a conductive path between the cathode 7-10 of the tube V1 and the grid 108 of the tube V6, this circuit also passing through the switch S3D which has been moved into its number 5 contact position as already indicated. Since we are now concerned with the dark or reflective method of testing the watthour meters, as already stated, the switch S3 has been moved into its fifth position. It can be seen that the switch unit S3D will impress a B plus voltage onto the plate 104 of the tube V6 to the relay 2K, this B plus voltage having been derived from the output from the filter designated by the numeral 138. When the glow in the counting tube V1 has traversed the intervening cathodes preceding the cathode 7-10 and then reaches the cathode 7-10, it can be appreciated that the thyratron tube V6 will fire and energize the relay 2K which action opens the contacts 2K1 and the potential circuit of the standard meter 10a, thus stopping this particular meter. Of course, inasmuch as the glow has reached the cathode 7-10, which as hereinbefore indicated was the desired number of revolutions, it will be recognized that the standard meter 10a has stopped after ten revolutions of the test meter 10b, this of course being the result desired. Knowing the number of revolutions made by the test meter 10b, all that the operator now has to do is read the dial or dials of the standard meter 10c. Any deviation is the error.

Since it is customary to test the meter 10b or 10c under light load conditions as well as full load ones, it is extremely desirable to have a preset light load count which is usually of the order of one or two revolutions with the full load count being five or ten. To attain the full load testing which has just been described, the selector switch S2 should first be moved to its number ten contact position. However, in achieving a light load testing operation the switch S1 is responsible for this particular load and accordingly is moved to a desired contact position. Inasmuch as the switches S1 and S2 are under the influence of "full load-light load" relay 3K both of these switches S1 and S2 may be initially preset for the desired full load and light load condition. For the purpose of continuing the operational description, it will now be assumed that the switch S1 has been set to its number two position. In this regard the switch S3 will now be moved to its number four position and in this number four position the relay 3K remains unenergized thus causing the various contacts 3K1, 3K2, 3K3, and 3K4 to remain in their upper positions, that is the positions depicted in the drawing. On the other hand, during the full load testing there has been described the positioning of the switch S3 into its fifth contact position which was responsible for energizing the relay 3K and in its energized condition the relay 3K picked up the various contacts 3K1, 3K2, 3K3, and 3K4.

The relay 3K is subjected to control in the following manner which is of such importance that a more detailed review should probably be given. In this regard, it will be noted that when switch unit S3B and switch unit S3C are in their first or fourth position the relay 3K is deenergized thus conditioning the system for the light load testing. In position two or five the B plus potential from the filter circuit 138 is impressed on the relay 3K through the resistor R29. On the other hand, in the positions 3 and 6 the relay 3K is controlled by the thyratron tube V4.

Further, a very important feature in the invention should be explained with respect to the automatic switching from full load operation to a light load operation. To this end the current transformer 130 is provided and may be slipped over the current coil lead 132 so as to obtain a derivative of the current passing to both the current coils 14a and 14b. Upon the flow of current to the lead 132 an alternating voltage is induced in the secondary of the transformer 130. The voltage derived from the current transformer 130 is rectified by means of the rectifier 134 and the D.C. component is impressed on the grid 96 of the tube V4 through the current limiting resistor R26. By virtue of the switch S3 one lead from the relay 3K is connected directly to the plate of the tube V4 and the other lead to the 350 volt A.C. output supplied by the transformer 136. By so arranging the circuitry, when the D.C. grid voltage reaches a given value the tube V4 will pass current through the relay 3K each time the plate 92 swings positive but due to the presence of the condenser C6 the relay 3K is maintained energized on negative plate swings but as soon as the signal is removed, the relay 3K will drop out, as the tube V4 will quench on the next negative half cycle of plate voltage. Owing to the employment of resistors R27 and R28 the tube V4 is biased to fire any time the current flowing through the conductor 132, which has already been mentioned as being in the circuit with the various current coils of the meters, reaches a predetermined value. In this way an automatic switching of the full load to light load count is realized since the light load current, normally about 10% of the full load current, is ineffective for producing the proper bias on the grid 96. Stated somewhat differently, when the automatic operation is to be resorted to, then the switch assemblies S1 and S2 are set to the desired revolution count and after the full load test has been completed, then an adjustment is made with respect to the rheostat 32 to provide the lesser current value for light current testing, and it is the change in this current that produces the firing of the tube V4 so that the light load testing then follows automatically once the manually operated switch S5 is depressed into its starting position again. Returning to test the light load operation that involves placing the switch S3 in its number 4 position, eliminating for the moment any automatic operation, as outlined below it will be observed that when the switch S1 is set to complete the electrical circuit to the second contact thereof, then when the glow reaches the cathode 7-2 of the counting tube V1 the "stop" tube V6 will be caused to fire, and it is the firing of this tube that energizes the relay 2K to open the contacts 2K1 positioned in circuit with the potential coil 12a of the standard watthour meter 10a.

Passing now to what is termed a "light" testing operation, that is, where the light beam actually intersects the anti-creep holes 22 of the induction disc 16c belonging to the watthour meter 10, the only real difference between the dark and light watthour meter testing resides in the photoelectric circuits. This change involves a modification of the circuitry so that an increase in light will cause the grid 84 of the tube V2 to go negative, and this is the express function of the switch unit S3A, for it brings into play either the resistor R1A, used for the "reflective" or "dark" method, or the resistor R1B which is of the same magnitude but used in the "light" method.

Further, the trigger tube V3 and the counting tube V1 function in the same manner with the exception that the selector switch points on the switches S1 and S2 are arranged so that only alternate cathodes within the counting tube V1 are utilized as far as picking up the glow which traverses these various cathodes, all in the manner set forth above. To facilitate an understanding of the cathode pattern utilized in the revolution count when the light method is employed, the following tabulation will prove of considerable help:

| Revolution count: | Cathode number |
|---|---|
| 1 | 7-2 |
| 2 | 7-4 |
| 3 | 7-6 |
| 4 | 7-8 |
| 5 | 7-10 |
| 6 | 70 |
| 7 | 7-2 |
| 8 | 7-4 |
| 9 | 7-6 |
| 10 | 7-8 |

In any of the light positions of the switch S3, that is the number first, second, or third contact positions, plate voltage is applied to the thyratron tube V6 via the contacts 4K1 of the relay 4K which has been energized by the "hold" thyratron tube V7. For any count up to five revolutions potential is applied to V6 directly by way of the contacts of the switch units S1C or S2C, the reason for this being that it is desired that the tube V6 fire the first time that a glow within the tube V1 strikes any preset cathode for a one to five revolution count. If the preset count exceeds five, then the tube V6 must be prevented from firing until the glow starts around the counting tube V1 for the second time. This is the specific function of the hold tube V7 and to permit its proper functioning, the grid 114 of this tube is coupled through the condenser C7 to the cathode 7-10 at all times.

The following example will serve to illustrate the operation of the circuitry under these selected conditions. Assume that a count of six revolutions is desired. The relays 1K, 2K and 4K are deenergized and the tubes V5, V6 and V7 quenched by the momentary opening of the switch S5B inasmuch as the switch S5 includes contacts S5A as well as S5C. The contacts S5A are open by the same movement, thus resetting the counting tube V1. As the first anti-creep hole 22 in the meter disc 16c intersects the light beam produced by the light source 24c, a pulse is generated causing the glow to jump from the cathode 68 to the cathode 70. As soon as the cathode 70 goes positive the tube V5 fires and is instrumental in energizing the relay 1K which in turn closes the potential circuit to the standard watthour meter 10a inasmuch as the energization of the relay 1K is responsible for the closing of its contacts 1K1.

The counting tube V1 will count the next ten pulses (that is five revolutions of the meter disc 16c) but thyratron tube V6 will not fire even though its grid 108 is connected to the cathode 70 (count number six as illustrated in the tabulation presented above), since there is no plate voltage on the tube V6. When the tenth pulse arrives the glow will be on the cathode 7-10 causing the hold thyratron tube V7 to fire and relay 4K will become energized with the result that plate potential is applied to the tube V6. The next pulse will transfer the glow to the cathode 68 (5½ revolutions) and the pulse after that to the cathode 70 (6 revolutions). Because the tube V6 now is provided with plate potential, it is now capable of firing and the firing of this tube energizes the relay 2K to open its contacts 2K1 disposed in the potential circuit which includes the potential coil 12a.

To insure that the potential circuit will remain open between tests, an additional pair of holding contacts 2K2 are placed on the relay 2K. The role played by these contacts 2K2 is to keep the plate potential on the tube V6 until the start switch S5A is depressed. It might be explained, mainly in review, that the switch S5 is a three-position type of switch and that the center position of the contacts S5A, S5B and S5C is closed, but that at the start position of the switch the contacts S5A and S5B are opened to reset the tube V3 and at the same time quench the tubes V5, V6 and V7. On the other hand in the stop position the bias is removed from the tubes V5, V6 and V7 permitting them to fire. In this way the potential circuit of the standard watthour meter 10a is opened and the entire system is kept inoperative until the switch contacts S5A are momentarily placed in their start position.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic

What is claimed is:

1. In a photoelectric counting system for testing watthour meters according to either a light or dark method, photoelectric means responsive to changing light conditions caused by the rotation of a watthour meter induction disc, means for amplifying the electrical output pulses from said photoelectric means, means for triggering said output pulses, a counting tube equipped with a plate and a plurality of cathodes, means for applying the output pulses from said triggering means to said tube to shift a glow discharge within the tube from one cathode to succeeding cathodes, selective switch means for establishing an electrical connection between each cathode or alternate cathodes, means for performing a start function when the glow is directed to one cathode, means for performing a stop function when the glow is directed to another cathode selected by said switch means, and hold means for inactivating said stop means during the early portion of the period when the electrical connection has been established between the switch means and alternate cathodes.

2. In a photoelectric counting system for comparing the revolutions of a test watthour meter with those of a standard meter according to either a light or dark method, photoelectric means for producing output electrical pulses in the ratio of two pulses per revolution of the test watthour meter's induction disc during the light method and one pulse per revolution of said disc during the dark method, a counting tube equipped with a plate and a plurality of cathodes, there being a starting cathode and a group of ten other cathodes for indicating a count from one to ten, means for starting the standard meter when the glow is between the plate and said starting cathode, means for stopping the standard meter when the glow is between the plate and another cathode, and switch means for establishing a circuit between any one of said group of ten cathodes when the dark testing method is employed and alternate cathodes when the light method is used, whereby a revolution count is obtained when using the light method by selecting the second cathode in the ten cathode group to indicate a revolution count of one, the fourth cathode to indicate a revolution count of two, the sixth to indicate a count of three, the eighth to indicate a count of four, the tenth to indicate a count of five, the starting cathode to indicate a count of six, the second to indicate a count of seven, the fourth to indicate a count of eight, the sixth to indicate a count of nine, and the eighth to indicate a count of ten.

3. A counting system in accordance with claim 2 including holding means for inactivating the stop means during the cathode connections producing a selected revolution count of from one to five during the light method testing.

4. In a counting system for comparing the revolutions of a test watthour meter with those of a standard meter under a full load condition and also under a light load condition, a full load selector switch having a plurality of contact positions, a light load selector switch having a plurality of contact positions, counting means, means for connecting said counting means in circuit with the full load and light load selector switches, and means dependent upon the magnitude of load current for rendering either the full load or light load selector switch effective.

5. A counting system in accordance with claim 4 in which means for performing a stop function is provided and is selectively connected into circuit with either the full load or light load selector switches.

6. In a counting system for comparing the revolutions of a test watthour meter with those of a standard meter under two different load conditions, means for conditioning the system for a first load test, means for conditioning the system for a second load test, and means responsive to load current for rendering either the first or second conditioning means effective in accordance with the relative magnitude of selected load current.

7. In a counting system for comparing the revolutions of a test watthour meter with those of a standard meter under two different load conditions, each of said meters having a potential coil in parallel with each other and a current coil in series with each other, means for starting said standard meter, means for stopping said standard meter, a first load selector means, a second load selector means, and means dependent upon the magnitude of current flowing through said current coils for connecting either the first or second selector means to said stopping means.

8. In a counting system for comparing the revolutions of a test watthour meter with those of a standard meter under two different load conditions, each of said meters having a potential coil in parallel with each other and a current coil in series with each other, means for energizing the potential coil of the standard meter to start said standard meter, means for deenergizing said standard meter potential coil to stop said standard meter, a first load revolution selector switch means, a second load revolution selector switch means, and switch means dependent upon the magnitude of current flowing through said current coils for connecting either the first or second load selector switch means in circuit with said stopping means to stop said standard meter after a predetermined respective number of induction disc revolutions preset on each of said selector switch means.

9. In a photoelectric counting system for comparing the revolutions of a test watthour meter with those of a standard meter under full load and light load conditions, each of said meters having a potential coil in parallel with each other and a current coil in series with each other, photoelectric means responsive to changes in light intensity by the rotatable induction disc of the test meter for producing a sequence of electric pulses in accordance with the number of revolutions made by said disc, a counting tube for counting said pulses equipped with a plate and a plurality of cathodes, means in circuit with one of said cathodes for energizing the potential coil of the standard meter to start same when that cathode is energized, a full load selector switch means in circuit with a group of said cathodes for selecting a preferred cathode to provide an electrical indication of when a specific count has been reached under full load operation, a light load selector switch means in circuit with said group of cathodes for selecting a preferred cathode to provide an electrical indication of when a specific count has been reached under light load operation, means connectable to either said full load or light load selector switch means for deenergizing the potential coil of said standard meter to stop same, and relay means responsive to the magnitude of current flowing through said current coils for connecting either the full load or light load selector switch means in circuit with said stopping means.

10. A counting system in accordance with claim 9 in which means are also included for obtaining a count in accordance with a single light change for revolution of the test meter's induction disc or a count in accordance with two light changes per revolution of said disc.

11. A counting system in accordance with claim 9 in which there is a current transformer for the purpose of obtaining a current derivative of the load current, rectifying means for said derivative and a thyratron tube in circuit with said relay means, said thyratron having a grid element electrically connected to said rectifier means.

12. A counting system in accordance with claim 11 in which adjustable biasing means are employed for said thyratron tube to preset the firing of said thyratron for various values of load current.

13. In a counting system for comparing the revolutions of a test watthour meter with those of a standard meter, counting means for counting electrical pulses produced at a rate of one pulse per revolution of the test watthour meter's induction disc or at a rate of two pulses per revolution of said disc, means for effecting a total count signal which is the same for either the one or two pulse rate, and total count selection means for automatically conditioning the system for full load or light load operation in accordance with the magnitude of load current supplied to said meters.

14. In a photoelectric counting system for comparing the revolutions of a test watthour meter with those of a standard meter, a counting tube equipped with a plate and a plurality of cathodes between which a glow discharge may be established, photoelectric means responsive to light intensity changes with respect to the rotatable induction disc of the test watthour meter to produce electric pulses at a rate of one pulse per revolution of said disc or at a rate of two pulses per revolution to cause progression of the glow from the plate and one cathode of succeeding cathodes, switch means for selecting certain cathodes to give a count reading indicative of the one pulse per revolution rate, switch means for selecting certain cathodes to give the same count reading indicative of the two pulse per revolution rate, means for starting the test meter, means for stopping said test meter, said last mentioned means being controlled by either the first or second mentioned switch means, and means responsive to current flow to said meters for conditioning the system for a full load or light load revolution count.

15. A system in accordance with claim 14 in which said electric pulses have relatively slow voltage change characteristics, the system including means for converting said pulses to pulses having a relatively sharp rate of voltage change before delivery to said counting tube.

16. In a photoelectric counting system for comparing the revolutions of a test watthour meter to those of a standard meter, a counting tube equipped with a plate and a plurality of cathodes between which a glow discharge may be established, photoelectric means responsive to light intensity changes with respect to the rotatable induction disc of the test watthour meter to produce electric pulses at a rate of one pulse per revolution of said disc or at a rate of two pulses per revolution to cause progression of the glow from the plate and one cathode to succeeding cathodes, said electric pulses having relatively slow voltage change characteristics, means for converting said pulses to pulses having a relatively sharp rate of voltage change before delivery to said counting tube, switch means for selecting certain cathodes to give a count reading indicative of the one pulse per revolution rate, switch means for selecting certain cathodes to give the same count reading indicative of the two pulse per revolution rate, means for starting the test meter, and means for stopping said test meter, said last mentioned means being controlled by either the first or second mentioned switch means.

17. In a photoelectric counting system for comparing the revolutions of a test watthour meter to those of a standard meter, a counting tube equipped with a plate and a plurality of cathodes between which a glow discharge may be established, photoelectric means responsive to light intensity changes with respect to the rotatable induction disc of the test watthour meter to produce electric pulses at a rate of one pulse per revolution of said disc or at a rate of two pulses per revolution to cause progression of the glow from the plate and one cathode to succeeding cathodes, said electric pulses having relatively slow voltage change characteristics, means for converting said pulses to pulses having a relatively sharp rate of voltage change before delivery to said counting tube, means for starting the test meter, means for stopping said test meter after its induction disc has made a predetermined number of revolutions, and means responsive to current flow to said meters for conditioning the system for a full load or light load revolution count.

18. In a counting system, a counting tube provided with a plate, a plurality of cathodes including a starting cathode and additional cathodes numbered from one to ten, a rotatable member, the revolutions of which are to be counted, means supplying electrical pulses to said counting tube either in a 1:1 ratio or 2:1 ratio with the revolutions of said rotatable member, means for starting said rotatable member, means for stopping said rotatable member, circuit means connecting said start means to one of said cathodes, switch means including a switch unit connecting said stop means to a different cathode to a give a direct reading of the revolutions made by said rotatable member when said tube is subjected to pulses in said 1:1 ratio and a switch unit connecting said stop means to alternate of said additional cathodes to give a direct reading of the revolutions made by said rotatable member when said tube is subjected to pulses in said 2:1 ratio, and holding means for preventing said stop means from functioning during the first cyclic energization of said alternate cathodes when said tube is subjected to pulses in said 2:1 ratio.

19. In a photoelectric counting system for testing watthour meters according to either a light or dark method, photoelectric means responsive to changing light conditions caused by the rotation of a watthour meter induction disc, means for amplifying the electrical output pulses from said photoelectric means, means for triggering said output pulses, a counting tube equippd with a plate and a plurality of cathodes, means for applying the output pulses from said triggering means to said tube to shift a glow discharge within the tube from one cathode to succeeding cathodes, means for performing a start function when the glow is directed to one cathode, means for performing a stop function when the glow is directed to another cathode, hold means, and means for causing said hold means to inactivate said stop means during a portion of the light method testing procedure.

References Cited in the file of this patent

UNITED STATES PATENTS

| | | |
|---|---|---|
| 2,427,533 | Overbeck | Sept. 16, 1947 |
| 2,473,159 | Lyman | June 14, 1949 |
| 2,575,517 | Hagen | Nov. 20, 1951 |
| 2,586,008 | Davis | Feb. 19, 1952 |
| 2,599,378 | Fleischmann | June 3, 1952 |
| 2,688,117 | Knopp | Aug. 31, 1954 |
| 2,860,286 | Ost | Nov. 11, 1958 |
| 2,872,620 | Beck et al. | Feb. 3, 1959 |

FOREIGN PATENTS

| | | |
|---|---|---|
| 507,269 | Belgium | Dec. 15, 1951 |

OTHER REFERENCES

"Recent Developments in Comparative Methods of Testing A.C. Electricity Meters," article in Proceedings of the Institution of Electrical Engineers, April 1950, pages 97–107.